US008252355B2

(12) United States Patent
Mizuno et al.

(10) Patent No.: US 8,252,355 B2
(45) Date of Patent: Aug. 28, 2012

(54) METHOD OF PRODUCING COOKED RICE BY INTERMITTENT HEATING

(75) Inventors: Hiroshi Mizuno, Gunma (JP); Tatuya Yamamoto, Gunma (JP)

(73) Assignee: Ajinomoto Co., Inc., Tokyo (JP)

( * ) Notice: Subject to any disclaimer, the term of this patent is extended or adjusted under 35 U.S.C. 154(b) by 557 days.

(21) Appl. No.: 12/076,484

(22) Filed: Mar. 19, 2008

(65) Prior Publication Data

US 2008/0233258 A1    Sep. 25, 2008

(51) Int. Cl.
*A23L 1/20* (2006.01)

(52) U.S. Cl. ........ 426/508; 426/523; 426/524; 426/233; 99/324

(58) Field of Classification Search ............... 426/523, 426/233, 508, 231, 524; 99/324, 325, 327; 219/623, 440, 447.1, 448.11
See application file for complete search history.

(56) References Cited

U.S. PATENT DOCUMENTS

| | | | | |
|---|---|---|---|---|
| 4,818,547 | A | * | 4/1989 | Miwa et al. ............... 426/233 |
| 5,830,520 | A | * | 11/1998 | You ......................... 426/233 |
| 2005/0019465 | A1 | * | 1/2005 | Yamamoto et al. ........ 426/508 |
| 2005/0120887 | A1 | * | 6/2005 | Ejaz et al. ................. 99/331 |

FOREIGN PATENT DOCUMENTS

| JP | 55-151918 | | 11/1980 |
|---|---|---|---|
| JP | 60041452 | A  * | 3/1985 |
| JP | 03237939 | A  * | 10/1991 |
| JP | 09248245 | A  * | 9/1997 |
| JP | 10-023962 | A | 1/1998 |
| JP | 10-042806 | A | 2/1998 |
| JP | 2001-037635 | | 2/2001 |
| JP | 2001037635 | A  * | 2/2001 |
| JP | 2003-290025 | A | 10/2003 |
| JP | 2004065328 | A  * | 3/2004 |
| JP | 2006334126 | A  * | 12/2006 |

OTHER PUBLICATIONS

Parkinson, Rhonda. "How to Cook Rice." About.com. Mar. 3, 2005. Accessed Jan. 7, 2009 from the World Wide Web: http://web.archive.org/web/20050303004212/http://chinesefood.about.com/cs/rice/ht/cookrice.htm.*

Office Action issued in Japanese Patent Application No. JP 2008-068686, dated Nov. 8, 2011.

* cited by examiner

*Primary Examiner* — Rena Dye
*Assistant Examiner* — Luana Z Long
(74) *Attorney, Agent, or Firm* — Edwards Wildman Palmer LLP; James E. Armstrong, IV; Junko Harada

(57) ABSTRACT

A method of producing cooked rice is disclosed, by which taste and mouthfeel, as well as the aging resistance, of the cooked rice are improved. In this method, process of cooking rice is carried out intermittently in a plurality of steps, interposing one or more cooling steps during the cooking process. In each cooling step, the rice is not heated. Each cooling step is carried out for 1 to 10 minutes at an inner temperature lower than the inner temperature during heating by 0.1 to 10° C. After the final cooling step, the final heating step is carried out to finish the rice-cooking process.

16 Claims, 3 Drawing Sheets

METHOD OF PRODUCING COOKED RICE BY INTERMITTENT HEATING

BACKGROUND OF THE INVENTION

I. Field of the Invention

The present invention relates to a method of producing cooked rice by heating a rice-cooking pot containing rice and water for boiling the rice.

II. Description of the Related Art

Rice-cooking processes are carried out by feeding rice washed and immersed in water, and water for boiling the rice in an amount suitable for the amount of the rice to a rice-cooking pot; and heating the rice-cooking pot. The rice-cooking pot is usually heated continuously from the beginning to the end of the cooking without interruption. With electric rice cookers and gas rice cookers, when the temperature at the inner side of the bottom of the rice-cooking pot (inner pot) reaches the preliminarily set temperature, it is judged as the cooking was completed and so the heating is finished.

On the other hand, it has been proposed to heat the cooked rice again for a time period after waiting for a prescribed time from the finish of the heating after the judgment that the cooking has been completed, in order to appropriately brown the cooked rice (see, for example, Patent Literature 1). It has also been proposed to heat the cooked rice for a prescribed time period when the cooked rice is incubated at 70° C. in order to inhibit the growth of microorganisms (see, for example, Patent Literature 2).

Patent Literature 1: JP 55-151918 A
Patent Literature 1: JP 2001-37635 A

Although the inventions described in these patent literatures are for improving the taste of the cooked rice or for extending the shelf life of the cooked rice, the invention described in Patent Literature 1 is to appropriately brown the cooked rice, and the invention described in Patent Literature 2 is to inhibit growth of microorganisms during incubation, and in both of these inventions, the cooking process per se is carried out by a conventional process and how to carry out the cooking process per se is not studied at all. Further, although it is known to additionally heat the cooked rice after finish of the cooking rice, the additional heating is performed on the cooked rice of which cooking has been completed, and the heating during the rice-cooking process is continued from the beginning to the end without interruption.

SUMMARY OF THE INVENTION

An object of the present invention is to provide a method of producing cooked rice by which taste and mouthfeel, as well as the aging resistance, of the cooked rice are improved, by devising the heating conditions during the rice-cooking process.

To attain the above-described object, the present invention provides a method of producing cooked rice by intermittent heating, the method comprising the step of heating a rice-cooking pot containing rice and water, thereby cooking the rice, wherein at least one cooling step during which the rice-cooking pot is not heated is included during the heating step.

In a preferred mode, each of the at least one cooling step is started after the water in the rice-cooking pot is boiled, and the water is not boiled during each of the at least one cooling step. It is also preferred to compulsively cool the rice-cooking pot during at least one of the at least one cooling step. Each of the at least one cooling step is carried out preferably for 1 to 10 minutes, more preferably 1 to 5 minutes. In a preferred mode, the inner temperature of the rice-cooking pot during each of the at least one cooling step is lower than the inner temperature of the rice-cooking pot at the beginning of respective cooling step by 0.1° C. to 10° C.

In cases where the method of the present invention comprises one cooling step only, the cooling step is started when the weight of the contents in the rice-cooking pot reaches 100.1 to 110 taking the weight of the cooked rice at the end of the heating step as 100; and the heating step is finished by the second heating after the cooling step.

In cases where the method of the present invention comprises two cooling steps only, the first cooling step is started when the weight of the contents in the rice-cooking pot reaches 100.3 to 115 taking the weight of the cooked rice at the end of the heating step as 100; thereafter, the second heating is performed; thereafter, the second cooling step is started when the weight of the contents in the rice-cooking pot reaches 100.1 to 110; and the heating step is finished by the third heating after the second cooling step.

In cases where the method of the present invention comprises three cooling steps only, the first cooling step is started when the weight of the contents in the rice-cooking pot reaches 100.5 to 120 taking the weight of the cooked rice at the end of the heating step as 100; thereafter, the second heating is performed; thereafter, the second cooling step is started when the weight of the contents in the rice-cooking pot reaches 100.3 to 115; thereafter, the third heating is performed; thereafter, the third cooling step is started when the weight of the contents in the rice-cooking pot reaches 100.1 to 110; and the heating step is finished by the fourth heating after the third cooling step.

The present invention also provides a method of producing thawed cooked rice, the method comprising the steps of cooking the rice by the method according to any one of claims 1 to 11; freezing the cooked rice; and thawing the frozen rice.

By the method of the present invention employing the intermittent heating, since the heating during the rice-cooking process is carried out dividedly in two or more steps interposing at least one cooling step, the taste and mouthfeel, such as the feeling of soft-and-fullness, are improved, and the aging resistance is also improved, so that cooked rice with high quality which can be stored for a long time keeping the quality can be obtained.

DETAILED DESCRIPTION OF THE PREFERRED EMBODIMENTS

Figure 1:
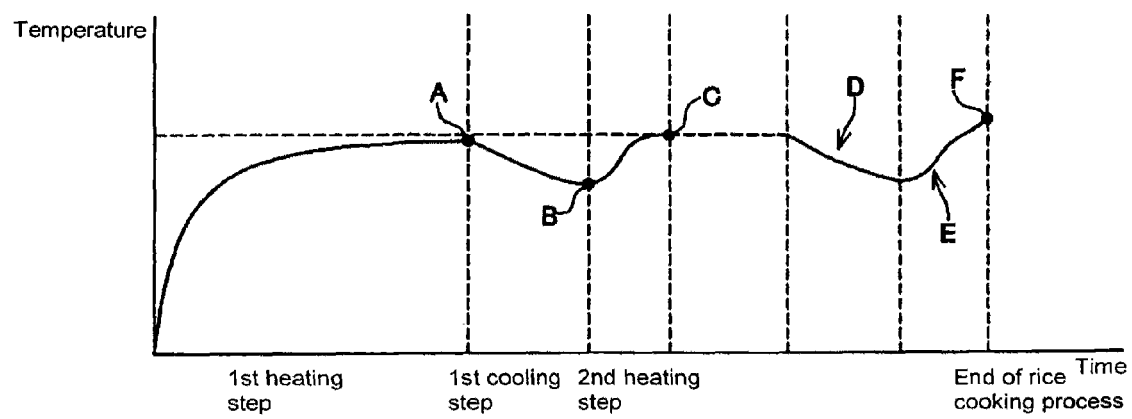
FIG. 1 shows an example of change in temperature in the rice-cooking pot subjected to the method of producing cooked rice according to the present invention employing intermittent heating.

FIG. 1 shows an example of change in temperature in the rice-cooking pot subjected to the method of producing cooked rice according to the present invention employing intermittent heating. Since the washing of the rice and immersion of the rice in water are conventional and any of the known methods may be employed, description of the washing step and immersion step is omitted. The term "temperature in the rice-cooking pot" means the temperature of the inner side of the bottom of the rice-cooking pot.

First, rice and water for boiling the rice are fed to a usual rice-cooking pot in a conventional manner, and a first heating step is started. The means for heating the rice-cooking pot is not restricted, and any of those employed for cooking rice, such as electricity, fuel gas or the like, may be employed. The heating in the first heating step is carried out until the water in the rice-cooking pot is heated immediately before boiling, or until the water in the rice-cooking pot boils, or until the boiling of the water in the rice-cooking pot is maintained for a preliminarily set time. For example, as shown in FIG. 1, the first heating step is continued until the water starts to boil (Point A in FIG. 1), and then a first cooling step is performed. In FIG. 1, the horizontal broken line indicates the boiling point of water. The time period of the first heating step varies depending on the amount of the rice and the heating means.

The first cooling step is a step for interrupting the heating of the rice-cooking pot so as to cool the rice in the rice-cooking pot during cooking. The first cooling step may be carried out by merely turning off the heating means while mounting the rice-cooking pot on the heating means, or by removing the rice-cooking pot from the heating means so as to allow the rice-cooking pot to cool in the air at room temperature. Alternatively and preferably, the cooling step may be carried out by compulsively cooling the rice-cooking pot. The compulsive cooling step may be carried out by an optional cooling means. For example, it may be carried out by immersing the rice-cooking pot in cold water or iced water, or blowing cold air or cold water to the rice-cooking pot.

The final temperature in the first cooling step (Point B in FIG. 1) may be any temperature as long as it is lower than the temperature at the beginning of the first cooling step, that is, the temperature at the end of the first heating step. Thus, in cases where the first heating step is carried out until the water boils, the first cooling step may be attained by merely cooling the water to a non-boiling condition. For example, in cases where the temperature in the rice-cooking pot is 100° C. and the water is boiling, the first cooling step may be attained by merely lowering the temperature in the rice-cooking pot to 99.9° C. at which the water does not boil. However, the final temperature in the first cooling step is usually lower than the temperature at the beginning of the cooling step usually by 0.1 to 10° C., preferably by 0.5 to 5° C., more preferably by 1 to 2° C.

Although the time period of the first cooling step varies depending on the conditions such as the amount of the rice and heat conductivity of the rice-cooking pot, and depending on whether compulsive cooling is performed or not, it is usually 1 to 10 minutes, preferably 1 to 5 minutes. In cases where the rice-cooking pot is cooled in iced water, sufficient effect is obtained by employing a time period of 1 to 2 minutes. Thus, by employing an appropriate cooling means so as to cool the rice-cooking pot as quickly as possible, the overall time period of the method can be shortened while sufficiently obtaining the effect of the cooling step.

Although the temperature in the rice-cooking pot may be lowered to a temperature lower than the temperature at the beginning of the cooling step by more than 10° C. in the first cooling step, or the first cooling step may be performed for more than 10 minutes, lowering the temperature by more than 10° C. in a short time may require a special cooling means, and if the temperature at the end of the cooling step is too low, a longer time and larger energy are required for the second heating step, and the overall time period of the rice-cooking process becomes too long, which is not practical. These are also true when the cooling time is too long. In this case, in addition, the water absorption by the rice is increased, so that the taste of the cooked rice may be changed, or the water for boiling may run short and undesirable browning may occur in the subsequent heating step(s).

After completion of the first cooling step for a set time, by which the set temperature is attained (Point B in FIG. 1), the second heating step in which the rice-cooking pot is heated again is started. Although the second heating step may be carried out basically by using the same heating means used in the first heating step, it is preferred to use a heating means by which the water in the rice-cooking pot can be boiled as quickly as possible. That is, it is preferred to carry out the heating as quickly as possible by, for example, increasing the power (voltage and/or electric current) in case of electric heating, or increasing the flow rate of the fuel gas in case of fuel gas heating. The second heating step may be finished when the water in the rice-cooking pot is boiled, or when the boiling of the water in the rice-cooking pot is continued for a prescribed time (Point C in FIG. 1).

After the second heating step, the heating is interrupted and the second cooling step similar to the above-described first cooling step is carried out. The second cooling step may be carried out in the same manner as in the first cooling step, and the above-described explanations about the first cooling step are applied to the second cooling step too. After the second cooling step, the third heating step is carried. The third heating step may be carried out in the same manner as in the second heating step, and the above-described explanations about the second heating step are applied to the third heating step.

As desired, the above-described cooling step and the subsequent heating step may be repeated optional times, and after the final cooling step (Point D in FIG. 1), the final heating step (Point E in FIG. 1) is carried out until the completion of the rice-cooking process. When the temperature in the rice-cooking pot reaches the temperature at the completion of the cooking (Point F in FIG. 1), the rice-cooking process is finished. Thereafter, an incubation step or the like may be performed as in the conventional methods. Further heating may be performed in order to appropriately brown the cooked rice.

Although in the above explanations, the cooling steps are carried out three times or more, the method of the present invention may also comprise the cooling step only once or only twice. In such a case, the final heating step (i.e., the second heating step or the third heating step) may be carried out in the same manner as the final heating step just described above until the completion of the rice-cooking process.

Figure 2:
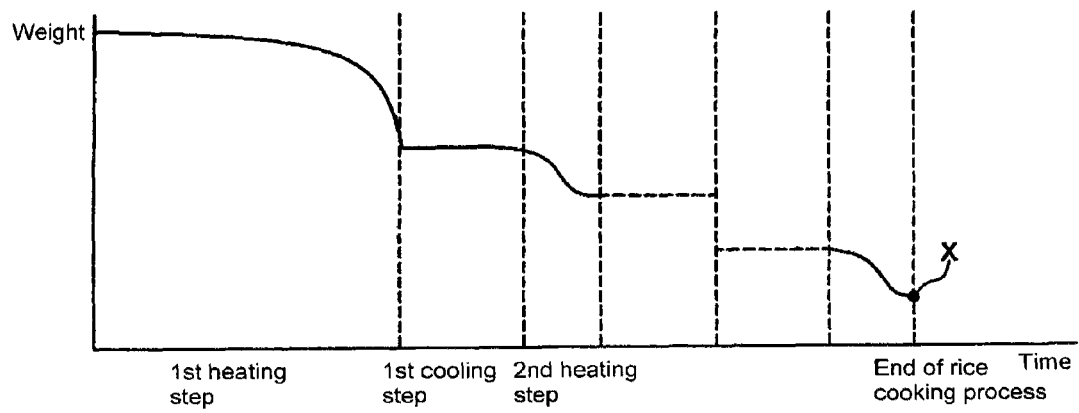
FIG. 2 shows an example of change in weight of contents in the rice-cooking pot subjected to the method of producing cooked rice according to the present invention employing intermittent heating.

FIG. 2 shows an example of the change in weight of the contents in the rice-cooking pot during the method of the present invention employing the intermittent heating. The heating steps and the cooling steps are as described above.

In the first heating step, the water temperature is raised and the amount of the evaporated water is increased. When the temperature becomes close to the boiling point, the weight of the contents in the rice-cooking pot is drastically decreased. The weight in the rice-cooking pot at the end of the first heating step varies depending on the number of cooling steps during the rice-cooking process.

For example, in cases where the cooling step is carried out only once, the cooling step may preferably be started when the weight of the contents in the rice-cooking pot becomes 100.1 to 110 taking the weight of the cooked rice (Point X in FIG. 2) after completion of the rice-cooking process as 100.

The cooling step may preferably be carried out for 1 to 10 minutes, more preferably 1 to 5 minutes, by which the temperature lower than the temperature at the beginning of the cooling step usually by 0.1 to 10° C., preferably by 0.5 to 5° C., still more preferably by 1 to 2° C. is attained. Since the temperature in the rice-cooking pot is low during the cooling step, the amount of the evaporated water is decreased. In cases where the rice-cooking process is carried out in a closed state covering the rice-cooking pot with a cover, since substantially no evaporation of water to the outside of the rice-cooking pot occurs, the weight loss of the contents in the rice-cooking pot is small, so that the rice-cooking process may be carried out under stable conditions. On the other hand, in cases where the rice-cooking pot is open without covering, evaporation of the water to the outside of the rice-cooking pot is large, and so the weight loss is larger than in cases where the rice-cooking pot is covered, but the contents can be cooled to the prescribed temperature within a shorter time. After the first cooling step, the second heating step is started and continued until the completion of the cooking of the rice.

In cases where the cooling steps are carried out twice, the first cooling step may preferably be started when the weight of the contents in the rice-cooking pot becomes 100.3 to 115 taking the weight of the cooked rice after completion of the rice-cooking process as 100. After the first cooling step, the second heating step is carried out, and then the second cooling step may preferably be started when the weight of the contents in the rice-cooking pot becomes 100.1 to 110. After the second cooling step, the third heating step is started and continued until the completion of the cooking of the rice.

In cases where the cooling steps are carried out three times, the first cooling step may preferably be started when the weight of the contents in the rice-cooking pot becomes 100.5 to 120 taking the weight of the cooked rice after completion of the rice-cooking process as 100. After the first cooling step, the second heating step is carried out, and then the second cooling step may preferably be started when the weight of the contents in the rice-cooking pot becomes 100.3 to 115. After the second cooling step, the third heating step is carried out and then the third cooling step may preferably be started when the weight of the contents in the rice-cooking pot becomes 100.1 to 110. After the third cooling step, the fourth heating step is started and continued until the completion of the cooking of the rice.

In cases where the heating step and the cooling step are switched based on the change in weight as described above, the properties of the cooked rice may be adjusted by increasing the amount of the water fed to the rice-cooking pot at the beginning of the rice-cooking process. That is, when the water fed to the rice-cooking pot is increased, in order to make the water absorption by the final cooked rice be almost the same as the rice cooked with a normal amount of water, it is necessary to increase the amount of the evaporated water in each heating step by prolonging the time period of each heating step. By increasing the amount of the evaporated water in each heating step, the mouthfeel of the cooked rice becomes springy, stickiness thereof is also increased, and the aging resistance also tends to be improved (It should be noted that many Japanese people prefer springy and sticky cooked rice). This is presumably because the cellular structure of the rice is broken or homogenized, or the gelatinization proceeds. However, if the overall time period of the heating steps is prolonged, the water for boiling the rice tends to run short due to the water absorption by the rice, and browning is likely to occur. The amount of water for boiling the rice, which is added to the rice-cooking pot, varies depending on the number of heating steps, and is preferably set such that amount of water evaporated to the outside of the rice-cooking pot is 0.01 to 0.1, preferably 0.03 to 0.07 taking the weight of the raw rice as 1.

By the above-described rice-cooking process in which the heating is performed intermittently interposing at least one cooling step, cooked rice having better aging resistance than that obtained by the conventional process may be obtained. The number of the heating steps may be any number as long as it is not less than 2 (i.e., the cooling step is at least one), and may be appropriately selected depending on the type and property of the rice, the amount of cooked rice, the shape of the rice-cooking pot, the type of the heating means, the taste and aging resistance demanded to the cooked rice, and so on. However, if the number of the heating steps is 2, the effects to improve the taste and the aging resistance of the cooked rice are relatively small, while if the number of the heating steps is too many, the time period of overall rice-cooking process is prolonged so that the practicality thereof is decreased, and administration and control of the steps tend to be difficult.

Thus, the number of the heating steps is most preferably 3 (i.e., the cooling steps are twice) or 4 (i.e., the cooling steps are third times). If the number of the heating steps is 5 or 6, although the aging resistance is improved, the cooked rice is too soft and the mouthfeel thereof is like glutinous rice. The time period of each of the second and subsequent heating steps after which a cooling step is performed is preferably within several minutes, for example, within 3 minutes in order to prevent shortage of the water for boiling and browning. Further, by equalizing the conditions of the cooling steps and of the heating steps after the first heating step, respectively, the state after completion of the cooking may be easily controlled. In cases where the rice-cooking process is carried out covering the rice-cooking pot, if the rice-cooking pot is opened, the amount of water evaporated to the outside is changed. Therefore, it is preferred to keep the rice-cooking pot covered during the rice-cooking process.

EXAMPLES

The present invention will now be described in more detail by way of examples thereof. It should be noted that the examples are presented for the illustration purpose only and should not be interpreted in any restrictive way.

Example 1

As shown in Table 1, using 100 g of raw rice (cv. Kirara 397), 6 kinds of rice-cooking processes (Control (without cooling step), Test 1-1, Test 1-2, Test 1-3, Test 1-4 and Test 1-5) were carried out. Time and temperature of first cooling step were variously set as shown in Table 1 below. The temperatures shown in Table 1 each indicates average temperature of cooked rice in the rice-cooking pot. "Water cooling" was carried out by immersing the rice-cooking pot in cold water; "ice cooling" was carried out by immersing the rice-cooking pot in iced water; and the others (with no explanation) were carried out by air cooling at room temperature. Second heating time represents the time until rice-cooking was completed. "Added water" in Table 1 means the amount of the added water taking the weight of the raw rice as 1. Controls in the below-described Examples were carried out by the same procedure as Control in Example 1.

TABLE 1

|  | Control | Test 1-1 | Test 1-2 | Test 1-3 | Test 1-4 | Test 1-5 |
|---|---|---|---|---|---|---|
| Added water (based on raw rice) | 1.4 | | | 1.45 | | |
| first heating time | | | | 17 min | | |
| Temperature at the end of first heating | | | | 100.1° C. | | |
| First cooling time | — | 3 min | 5 min | 10 min | 3 min, water cooling | 3 min, ice cooling |
| Temperature at the end of first cooling | — | 99.9° C. | 99.0° C. | | 90° C. | |
| 2nd heating time | — | 2 min | 2 min | | 3.5 min | |
| Temperature at the end of 2nd heating | — | | | 100.1° C. | | |
| Weight of cooked rice | 215.4 g | 215.0 g | 215.3 g | 215.5 g | 215.8 g | 215.9 g |

Physical properties of each cooked rice obtained in Control and Tests 1-1 to 1-5 were determined as follows:

Hardness was measured by using a texture analyzer. A grain of the cooked rice was placed on a support of the texture analyzer. The rice grain was pressed with a vertical rod, and the force (g) at which the grain was crushed was measured as the hardness. Then the vertical rod was pulled up. The force (g) at which the vertical rod was detached from the crushed grain was measured as the adherence. The hardness and adherence were measured when the rice grain was crushed by 30% and 90%, respectively. The values obtained when the rice grain was crushed by 30% are indicated as "Surface of Rice" in Table 2 below, and the values obtained when the rice grain was crushed by 90% are indicated as "Whole Rice" in Table 2 below.

The water content was determined by measuring the weight of the cooked rice before and after drying at 105° C. for 12 hours.

The results are shown in Table 2 below.

TABLE 2

| | | Surface of Rice | | Whole Rice | |
|---|---|---|---|---|---|
| | Water Content (%) | Hardness (g) | Adherence (g) | Hardness (g) | Adherence (g) |
| Control | 56.84 | 76.94 | 6.15 | 2202.57 | 47.41 |
| Test 1-1 | 60.84 | 86.26 | 7.63 | 2295.15 | 54.69 |
| Test 1-2 | 58.92 | 83.67 | 9.59 | 2284.56 | 59.30 |
| Test 1-3 | 57.65 | 75.47 | 3.04 | 2115.86 | 28.74 |
| Test 1-4 | 59.23 | 81.40 | 8.15 | 1995.61 | 53.54 |
| Test 1-5 | 59.10 | 86.00 | 9.75 | 2163.27 | 57.23 |

These results indicate that, compared with control rice cooked by an ordinary cooking process without a cooling step, the cooked rice of Test 1-1 increased in adherence (stickiness), and the cooked rice of Test 1-2 further increased in adherence (stickiness). The cooked rice of Test 1-3, obtained by carrying out 10-minute cooling, showed different properties from the others, as a result of increase in water absorption. The cooked rice of Test 1-4 and Test 1-5, obtained by the process in which the cooling steps were carried out in a short time at low temperature by using water cooling or ice cooling, showed increase in stickiness. The cooked rice of Test 1-5 increased in stickiness to a greater extent than that of Test 1-4. The cooked rice of Test 1-2 and Test 1-5 showed approximately the same physical properties.

Example 2

Five kinds of rice-cooking processes (Test 2-1, Test 2-2, Test 2-3, Test 2-4 and Test 2-5) were carried out. As shown in Table 3 below, the heating step was divided into 4 steps by inserting cooling steps (×3), and the heating time of second to fourth heating steps was adjusted to vary the amount of water evaporated in each heating step. For example, the process of Test 2-1 comprised second to fourth heating steps with three cooling steps (for 5 minutes each, by air cooling at room temperature), each of which heating steps was carried out for 56 seconds, and water in an amount of 0.48% (based on weight of the obtained cooked rice) was evaporated in each heating step (second to fourth). The heating time was adjusted taking account of the amount of water to be reduced by calculating the rate of steam generation from the rice cooker, and the amount of water added to the raw rice was also adjusted accordingly.

TABLE 3

| | Control | Test 1-1 | Test 1-2 | Test 1-3 | Test 1-4 | Test 1-5 |
|---|---|---|---|---|---|---|
| Added water (based on raw rice) | 1.4 | 1.43 | 1.49 | 1.55 | 1.61 | 1.67 |
| Water amount evaporated by single heating during 2nd and later heating steps (based on weight of cooked rice) | — | 0.48% | 1.4% | 2.4% | 3.3% | 4.3% |
| first heating time | | | | 17 min | | |
| first to 3rd cooling time | — | | | 5 min | | |
| 2nd to 4th heating time | — | 56 sec | 88 sec | 120 sec | 152 sec | 184 sec |
| Number of heating steps | 1 | | | 4 | | |

The sensory evaluation of the cooked rice obtained in Control and Tests 2-1 to 2-5 was carried out. The obtained cooked rice were assessed by scores in the range from −3 to +3 in 0.5 increments on the basis of the Control cooked rice (0). Aging resistance was evaluated by carrying out the sensory evaluation on the cooked rice once frozen, thawed under refrigeration and stored under refrigerated conditions for 6 hours.

The results are shown in Table 4 below.

TABLE 4

|  | Hardness soft(−3) ↓ hard(+3) | Stickiness weak(−3) ↓ strong(+3) | Aging resistance low(−3) ↓ high(+3) | Browning little(−3) ↓ heavily(+3) | Overall Judgment bad(−3) ↓ good(+3) |
|---|---|---|---|---|---|
| Control | 0 | 0 | 0 | 0 | 0 |
| Test 2-1 | −0.5 | 0.5 | 0 | 0 | 1 |
| Test 2-2 | −0.5 | 1 | 0.5 | 0 | 2 |
| Test 2-3 | −1 | 1.5 | 1 | 0.5 | 3 |
| Test 2-4 | −1 | 1.5 | 1 | 1 | 3 |
| Test 2-5 | −2 | 2 | 2 | 2 | 1 |

These results indicate that, as more water is evaporated by a single heating, the obtained cooked rice become softer with more glutinous texture, more stickier, and more resistant to aging. In cases where the amount of water evaporated by a single heating is small as shown in Test 2-1, a sufficient effect cannot be obtained, which suggests that destruction, homogenization and/or gelatinization of the structure of rice tend(s) to proceed when a lot of water is evaporated by a single heating.

On the other hand, as more water is evaporated by a single heating, browning occurs more heavily. This is presumably because when the amount of water evaporated by a single heating is increased, the time of second and later heating steps becomes longer, which leads to water absorption of rice and insufficiency of water required for cooking rice, thus resulting in occurrence of browning. In the case of Example 2, the suitable amount of water evaporated by a single heating during second and later steps is thought to be preferably in a range from 0.48 to 4.3%, more preferably from 1.4 to 3.3% based on the weight of the obtained cooked rice. Hence, in cases where an amount of water added to raw rice in the rice-cooking process is within the commonly-used range, it is desirable that an amount of water evaporated by a single heating during second and later steps is in a range from 0.3 to 5.0%, preferably from 1.0 to 3.5% based on the weight of the obtained cooked rice.

Example 3

Three kinds of rice-cooking processes (Test 3-1, Test 3-2 and Test 3-3) were carried out. The heating time of second to fourth heating steps was variously set as shown in Table 5 below. For example, the process of Test 3-1 comprised second to fourth heating steps with three cooling steps (for 5 minutes each, by air cooling at room temperature), each of which heating steps is carried out for 196 seconds at 80 V. The voltage shown in the table is the voltage of the electric rice cooker used as a heating means.

TABLE 5

|  | Control | Test 3-1 | Test 3-2 | Test 3-3 |
|---|---|---|---|---|
| Added water (based on raw rice) | 1.4 |  | 1.55 |  |
| Weight loss by a single heating during 2nd to 4th heating steps (based on weight of cooked rice) | 0% |  | 2.4% |  |

TABLE 5-continued

|  | Control | Test 3-1 | Test 3-2 | Test 3-3 |
|---|---|---|---|---|
| first heating time |  | 17 min | | |
| first to 3rd cooling time | — | 5 min | | |
| 2nd to 4th heating time | — | 196 sec | 120 sec | 66 sec |
| Voltage in 2nd to 4th heating | — | 80 V | 100 V | 130 V |
| Number of heating steps | 0 | 3 | | |

The sensory evaluation of the obtained cooked rice was carried out by the same procedure as described in Example 2. The results are shown in Table 6 below.

TABLE 6

|  | Hardness soft(−3) ↓ hard(+3) | Stickiness weak(−3) ↓ strong(+3) | Aging resistance low(−3) ↓ high(+3) | Browning little(−3) ↓ heavily(+3) | Overall Judgment bad(−3) ↓ good(+3) |
|---|---|---|---|---|---|
| Control | 0 | 0 | 0 | 0 | 0 |
| Test 3-1 | −0.5 | 0.5 | 1 | 1 | 1 |
| Test 3-2 | −1 | 1 | 1 | 0 | 3 |
| Test 3-3 | −1 | 2 | 1.5 | 1 | 2 |

These results indicate that as water is evaporated more rapidly by carrying out second to fourth heating steps within a shorter time, the obtained cooked rice become stickier with glutinous texture similar to glutinous rice.

Example 4

Three kinds of rice-cooking processes (Test 4-1, Test 4-2 and Test 4-3) were carried out. In these tests, the number of the cooling steps performed after first heating step was variously set as shown in Table 7 below, that is, the cooling step was carried out once to 3 times. For example, the process of Test 4-2 comprised two cooling steps, each of which carried out for 5 minutes by air cooling at room temperature, and therefore comprised second to third heating steps (for 2 minutes each).

TABLE 7

|  | Control | Test 4-1 | Test 4-2 | Test 4-3 |
|---|---|---|---|---|
| Added water (based on raw rice) | 1.4 | 1.7 | 1.7 | 1.7 |
| first heating time |  | 17 min | | |
| first cooling time | — | 5 min | | |
| Each heating time | — | 2 min | | |
| Number of cooling steps | none | 1 | 2 | 3 |

Each of the obtained cooked rice was frozen and then thawed under refrigeration at 5° C. Thereafter, each of the resulting cooked rice was stored under refrigeration for the time period shown in Table 8 below, followed by sensory evaluation. The results are shown in Table 8 below. The obtained cooked rice were assessed by scores in the range from 1 to 5 in 0.5 increments.

TABLE 8

| Time of Refrigerated Storage (hr) | Control | Test 4-1 | Test 4-2 | Test 4-3 |
|---|---|---|---|---|
| 0 | 5 | 5 | 5 | 5 |
| 6 | 3 | 4.5 | 4.5 | 4.5 |
| 24 | 2 | 3.5 | 3.5 | 4 |

5: very good
4: good
3: middling
2: bad
1: very bad

In addition, viscosity of the obtained cooked rice, which was stored in a refrigerator (5° C.) for a prescribed time, was measured by using Rapid Visco Analyzer (produced by Foss Japan). To the cell of the analyzer, 1.5 g of powdered cooked rice (Control and Tests 4-1 to 4-5) and 25 g of water were added, and the viscosity was measured while temperature was changed as follows: 30° C. for 0.5 minutes (from 0 to 0.5 min), raised at a rate of 5° C./min over 13 minutes (from 0.5 min to 13.5 min), 95° C. for 5 minutes (from 13.5 min to 18.5 min), dropped at a rate of 5° C./min over 9 minutes (from 18.5 min to 27.5 min), 50° C. for 10 minutes (from 27.5 min to 37.5 min).

Figure 3:
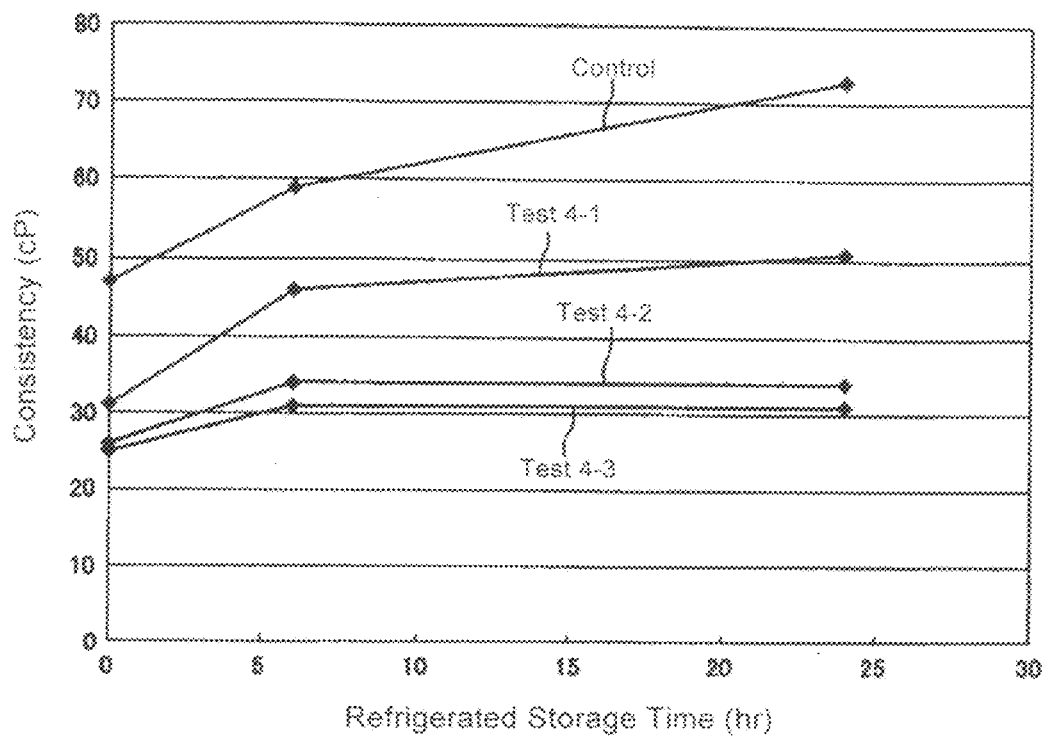
FIG. 3 shows the changes in consistency of the cooked rice during refrigerated storage, which were measured in Example 4.
Figure 4:
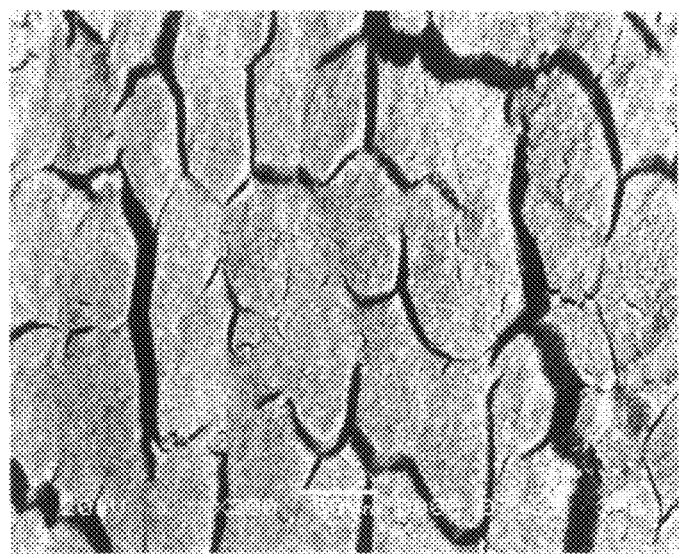
FIG. 4 is an electron micrograph showing the inner structure of the cooked rice produced in the control in Example 4.
Figure 5:
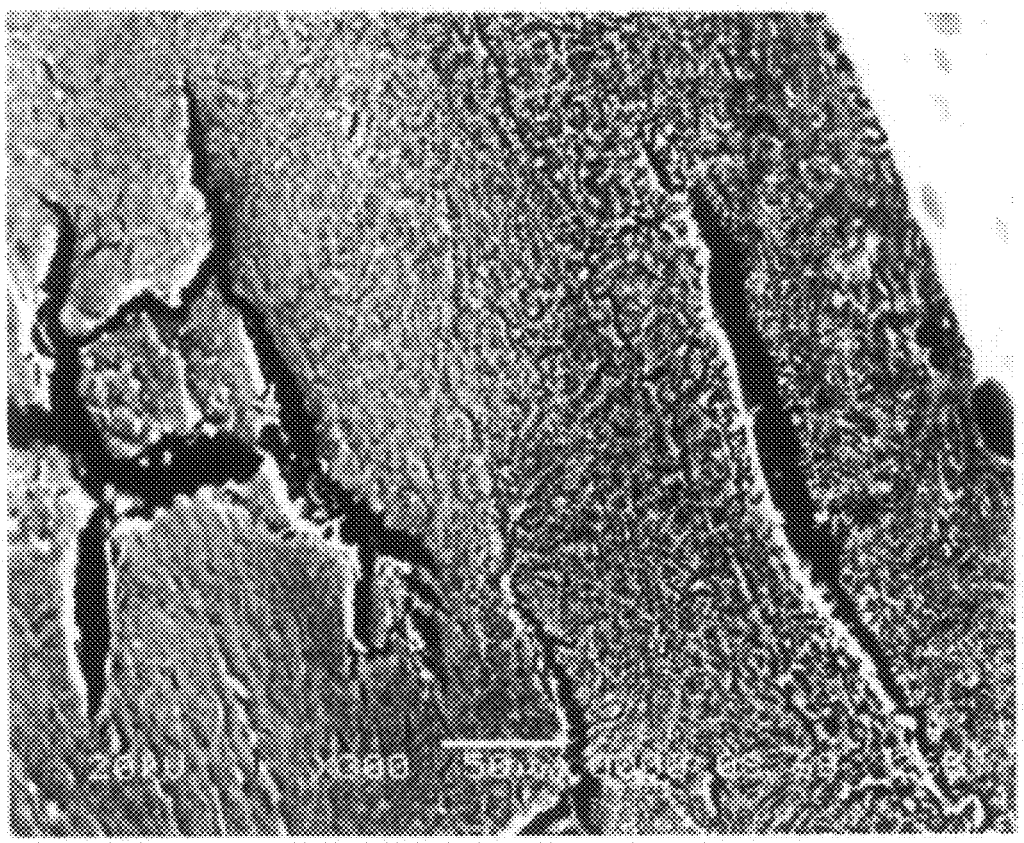
FIG. 5 is an electron micrograph showing the inner structure of the cooked rice produced in Test 4-2 in Example 4.

The value of "(final viscosity)–(minimum viscosity)" obtained from viscosity measurement is called as "consistency". It has been reported that consistency is closely related with aging of starch and therefore can be used as an indicator of aging resistance of cooked rice. FIG. 3 shows relationship between consistency and the time for refrigerated storage. FIGS. 4 and 5 show electron micrographs of the internal structure of the obtained cooked rice (Control and Test 4-2).

As shown in Table 8, in cases where the refrigerated storage time was 6 hours, all test rice samples kept a good taste while control rice sample became worse, even though control rice as well as Test rice samples represented a very good taste when the refrigerated storage time was 0 hour (i.e. at a state of freshly cooked rice). Further, in cases where the refrigerated storage time was 24 hours, cooked rice of Tests 4-1 and 4-2 represented a somewhat good taste and that of Test 4-3 kept a good quality, while taste of control rice became extremely bad. These results indicate that aging resistance can be greatly improved by inserting at least one cooling step into the heating step of the rice-cooking process so as to divide the heating step into a plural heating steps.

Moreover, by increasing the number of the cooling step, the change of consistency associated with the length of the refrigerated storage time became suppressed (FIG. 3), indicating that the good state of the freshly cooked rice may be kept by increased number of the cooling step.

According to observation by electron microscope, there were a lot of large cracks in control rice and cells thereof were split, while cracks of Test 4-2 rice were remarkably reduced and the structure became fine, indicating that destruction and homogenization of rice structure proceeded in Test 4-2 rice.

Example 5

As shown in Table 9, five kinds of rice-cooking processes (Control (without cooling step), Test 5-1, Test 5-2, Test 5-3 and Test 5-4) were carried out using 100 g of raw rice (cv. Kirara 397) to which water and sugar were blended. The cooling step was carried out twice to 5 times after first heating. For example, the process of Test 5-1 comprised two cooling steps, each of which carried out for 5 minutes by air cooling at room temperature, and therefore comprised second to third heating steps (for 2 minutes each). An amount of water to be added to raw rice was determined so that the weight of the obtained cooked rice is about 240 g.

TABLE 9

|  | Control | Test 5-1 | Test 5-2 | Test 5-3 | Test 5-4 |
|---|---|---|---|---|---|
| Added water (based on raw rice) | 1.61 | 1.71 | 1.76 | 1.81 | 1.86 |
| Sugar [g] | 6.8 | 6.8 | 6.8 | 6.8 | 6.8 |
| Number of cooling steps | 0 | 2 | 3 | 4 | 5 |

The obtained cooked rice samples (240 g each) were mixed with 25 g of seasoned vinegar (sushi vinegar) respectively to prepare sushi rice, and the obtained sushi rice were frozen completely by cooling. Thereafter the frozen sushi rice were thawed under the chilled condition of 5° C., and the thawed sushi rice were stored in a refrigerator (5° C.), followed by carrying out the sensory evaluation of the refrigerated rice by the same procedure as in Example 4. The results are shown in Table 10 below.

TABLE 10

| Refrigeration time [hr] | Control | Test 5-1 | Test 5-2 | Test 5-3 | Test 5-4 |
|---|---|---|---|---|---|
| 0 | 5.0 | 5.0 | 5.0 | 5.0 | 5.0 |
| 12 | 3.0 | 3.0 | 3.5 | 3.5 | 4.0 |
| 24 | 2.5 | 3.0 | 3.0 | 3.0 | 3.5 |
| 36 | 2.0 | 2.5 | 2.5 | 3.0 | 3.5 |

5: very good
4: good
3: middling
2: bad
1: very bad

In cases where the refrigeration time was 0 (i.e. immediately after finishing preparation of sushi rice), all sushi rice samples represented a very good taste. In cases where the refrigeration time became long, the taste of control sushi rice became extremely bad. The taste of sushi rice of Tests 5-1 and 5-2, cooked by the process comprising fewer cooling steps, tended to be worse in cases where the refrigeration time reached 36 hours. On the other hand, sushi rice of Tests 5-3 and 5-4, cooked by the process comprising many cooling steps, represented a good taste even when the refrigeration time exceeded 36 hours.

These results indicate that, even in cases of sushi rice, aging resistance can be greatly improved by inserting at least one cooling step into the heating step of the rice-cooking process so as to divide the heating step into a plural heating steps.

We claim:

1. A method of producing cooked rice, said method comprising, in the order mentioned, a first heating step of heating a rice-cooking pot containing rice and water to boil said rice; a first cooling step of cooling said rice for 1 to 10 minutes such that an inner temperature of said rice-cooking pot during the first cooling step is lower than the inner temperature of said rice-cooking pot at a start of said first cooling step by 0.1° C. to 10° C.; and a second heating step of boiling said rice.

2. The method according to claim 1, wherein said rice-cooking pot is cooled by immersing the rice-cooking pot in cold water or iced water, or blowing cold air or cold water to the rice-cooking pot during said first cooling step.

3. A method of producing thawed cooked rice, said method comprising the steps of:
cooking said rice by said method according to claim 2;
freezing obtained cooked rice; and
thawing obtained frozen rice.

4. The method according to claim 1, wherein said first cooling step is carried out for 1 to 5 minutes.

5. A method of producing thawed cooked rice, said method comprising the steps of:
cooking said rice by said method according to claim 4;
freezing obtained cooked rice; and
thawing obtained frozen rice.

6. The method according to claim 1, comprising one cooling step only, wherein
said first cooling step is started when a weight of a contents in said rice-cooking pot reaches 100.1 to 110 taking a prescribed weight of the cooked rice at the end of said second heating step as 100; and
said second heating step being a final heating step.

7. A method of producing thawed cooked rice, said method comprising the steps of:
cooking said rice by said method according to claim 6;
freezing obtained cooked rice; and
thawing obtained frozen rice.

8. The method according to claim 1, further comprising a second cooling step and a third heating step, and comprising two cooling steps only, wherein
the first cooling step is started when a weight of a contents in said rice-cooking pot reaches 100.3 to 115 taking a prescribed weight of the cooked rice at the end of said third heating step as 100;
thereafter, the second heating step is performed;
thereafter, the second cooling step is started when the weight of the contents in said rice-cooking pot reaches 100.1 to 110; and
said third heating step being a final heating step.

9. A method of producing thawed cooked rice, said method comprising the steps of:
cooking said rice by said method according to claim 8;
freezing obtained cooked rice; and
thawing obtained frozen rice.

10. The method according to claim 1, further comprising a second cooling step, a third heating step, a third cooling step and a fourth heating step, and comprising three cooling steps only, wherein
the first cooling step is started when a weight of a contents in said rice-cooking pot reaches 100.5 to 120 taking a prescribed weight of the cooked rice at the end of said fourth heating step as 100;
thereafter, the second heating step is performed;
thereafter, the second cooling step is started when the weight of the contents in said rice-cooking pot reaches 100.3 to 115;
thereafter, the third heating step is performed;
thereafter, the third cooling step is started when the weight of the contents in said rice-cooking pot reaches 100.1 to 110; and
said fourth heating step being a final heating step.

11. A method of producing thawed cooked rice, said method comprising the steps of:
cooking said rice by said method according to claim 10;
freezing obtained cooked rice; and
thawing obtained frozen rice.

12. The method according to claim 1, wherein said first step of heating said rice-cooking pot is carried out covering said rice-cooking pot with a cover.

13. A method of producing thawed cooked rice, said method comprising the steps of:
cooking said rice by said method according to claim 12;
freezing obtained cooked rice; and
thawing obtained frozen rice.

14. The method according to claim 1, wherein said first step of heating said rice-cooking pot is carried out without covering said rice-cooking pot.

15. A method of producing thawed cooked rice, said method comprising the steps of:
cooking said rice by said method according to claim 14;
freezing obtained cooked rice; and
thawing obtained frozen rice.

16. A method of producing thawed cooked rice, said method comprising the steps of:
cooking said rice by said method according to claim 1;
freezing obtained cooked rice; and
thawing obtained frozen rice.

* * * * *